F. P. SCHRODER.
TAP.
APPLICATION FILED JULY 28, 1919.
1,398,156.
Patented Nov. 22, 1921.
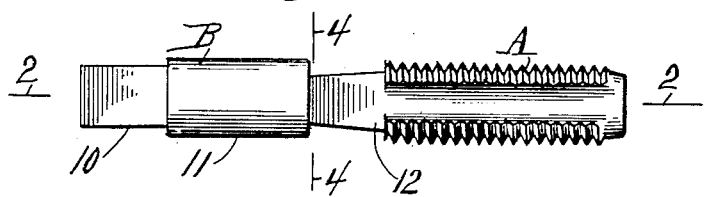
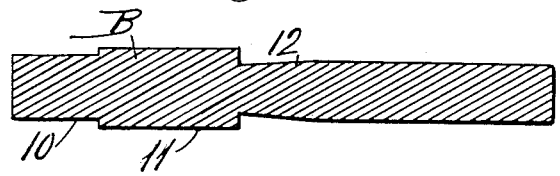
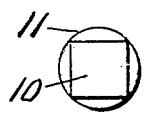 
Inventor
Frank P. Schroder
by A.H. de Bonneville
Attorney.

UNITED STATES PATENT OFFICE.

FRANK P. SCHRODER, OF PHILADELPHIA, PENNSYLVANIA.

TAP.

1,398,156.  Specification of Letters Patent.  Patented Nov. 22, 1921.

Application filed July 28, 1919. Serial No. 313,869.

*To all whom it may concern:*

Be it known that I, FRANK P. SCHRODER, a citizen of the United States, and resident of Philadelphia, in the county of Philadelphia and State of Pennsylvania, have invented certain new and useful Improvements in a Tap, of which the following is a specification.

This invention relates to an improvement in a tap for forming threads and is particularly directed to the shank of the tap. The said shank in a portion thereof is made of smaller cross-section than the remainder of the tap and thereby when the tap is overstrained it will break at said small cross-section. The said shank adjacent to said cross-section is formed with faces that will take a wrench or other suitable tool whereby the tap can be easily unscrewed from the hole that was being tapped therewith. The invention embraces any cutting tool with a shank having a portion with a cross-section smaller in area than any other cross-section of the tool.

In the drawings, Figure 1 represents an elevation of a tap exemplifying the invention; Fig. 2 shows a section of Fig. 1 on the line 2, 2; Fig. 3 is a lefthand side view of Fig. 1 and Fig. 4 represents a section of Fig. 1 on the line 4, 4.

The tap is shown with the flutes A and the shank in its entirety by the letter B. The said shank comprises the squared top portion 10, the cylindrical portion 11 and the pyramidal portion 12. The pyramidal portion 12 in this instance comprises the frustum of a right pyramid whose base is a regular polygon with four sides. The pyramidal portion 12 forms flat walls for the shank B.

It is to be understood that the number of sides or faces of the frustum can be decreased or increased. The top cross-section of the frustum on the line 4, 4, Fig. 1, is less in area than any other cross-section of the tap and is next adjacent to the cylindrical portions 11. By this disposition of the material of the tap any overstrain which causes a fracture of the tap will cause it to sever on a plane passing through the line 4, 4 perpendicular to the longitudinal axis of the tap. Thereby the frustum will remain attached to the fluted portion of the tap and permit a wrench or other suitable tool to be attached, to permit the broken tap to be unscrewed from the hole in the material that was being tapped.

Having described my invention what I desire to secure by Letters Patent and claim is:

1. In a tool the combination of a cutting portion and a shank, the said shank having a pyramidal portion formed therein adjacent to the cutting portion, the said pyramidal portion having a cross-section smaller in area than any other cross-section of the tool and another portion of the shank adapted to receive means to normally turn the tool.

2. In a tool the combination of cutting means, a shank extending from the cutting means comprising a top portion distant from the cutting means adapted to coact with other means to normally turn the tool, the said shank having a second portion also adapted to receive means to turn the tool, the said second portion adjacent to the cutting means and having a cross-section at a portion thereof smaller in area than any other cross section of the tool and said small cross-section located at the top end of the said second portion.

3. In a tap the combination of flutes and a shank, the said shank comprising an outer portion adapted to receive a wrench, a cylindrical portion next adjacent to said outer portion and a portion in the form of a frustum of a pyramid between the cylindrical portion and said flutes, a section of the frustum adjacent to the cylindrical portion and at right angles to the longitudinal axis of the tap being smaller in area than any other cross-section of the tap.

Signed at Philadelphia, in the county of Philadelphia and State of Pennsylvania, this 15 day of July, A. D. 1919.

FRANK P. SCHRODER.

Witnesses:
FRANK P. BERRY,
WILLIAM B. CLARK.